April 5, 1960  J. E. HANCOCK  2,931,451
TRACTOR TRAILER COUPLING AND POWER TRANSMISSION THERETHROUGH
Filed Feb. 17, 1958  6 Sheets-Sheet 1

INVENTOR.
James E. Hancock.
BY
Fishburn and Gold
ATTORNEYS.

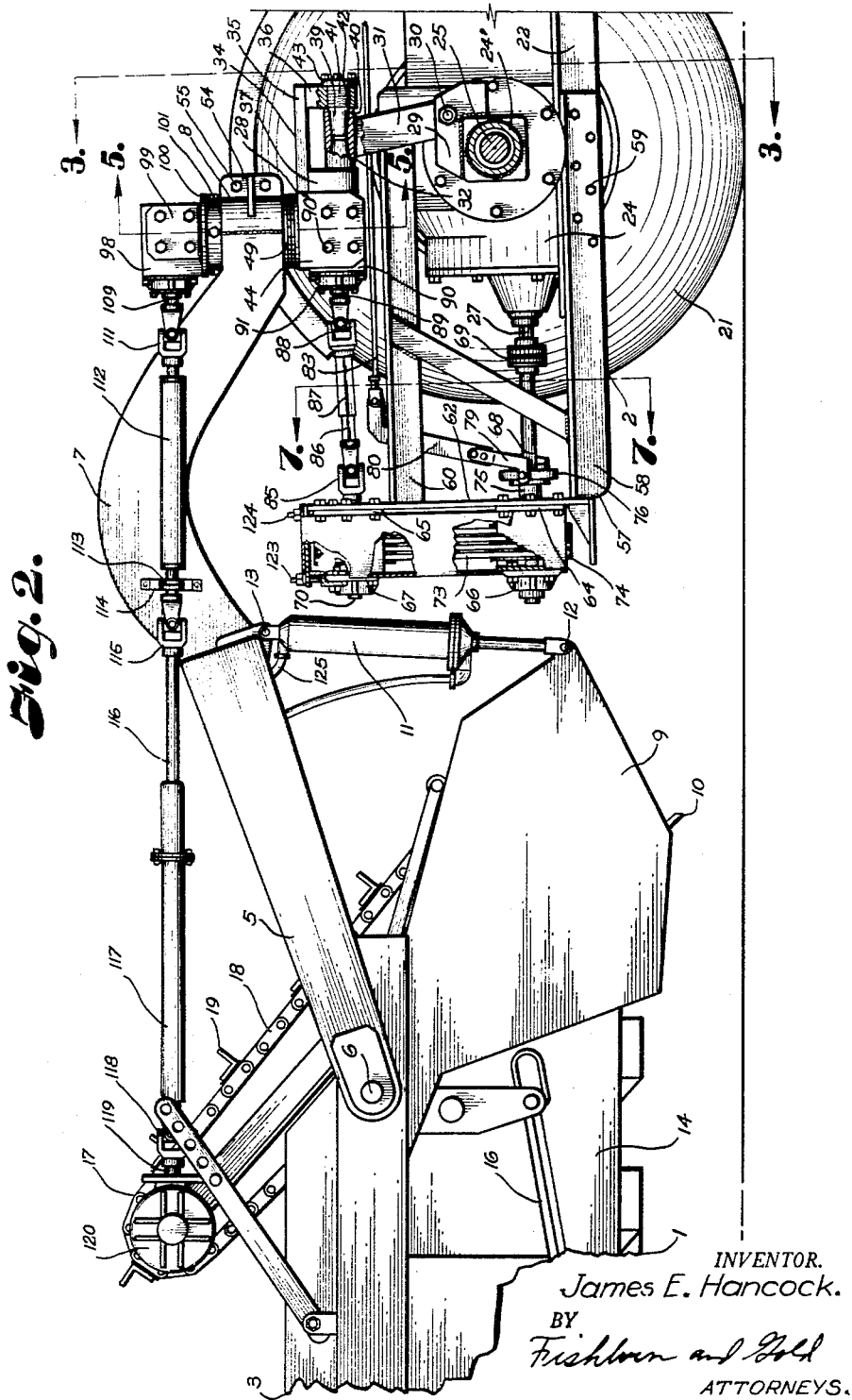

April 5, 1960 J. E. HANCOCK 2,931,451
TRACTOR TRAILER COUPLING AND POWER TRANSMISSION THERETHROUGH
Filed Feb. 17, 1958 6 Sheets-Sheet 3
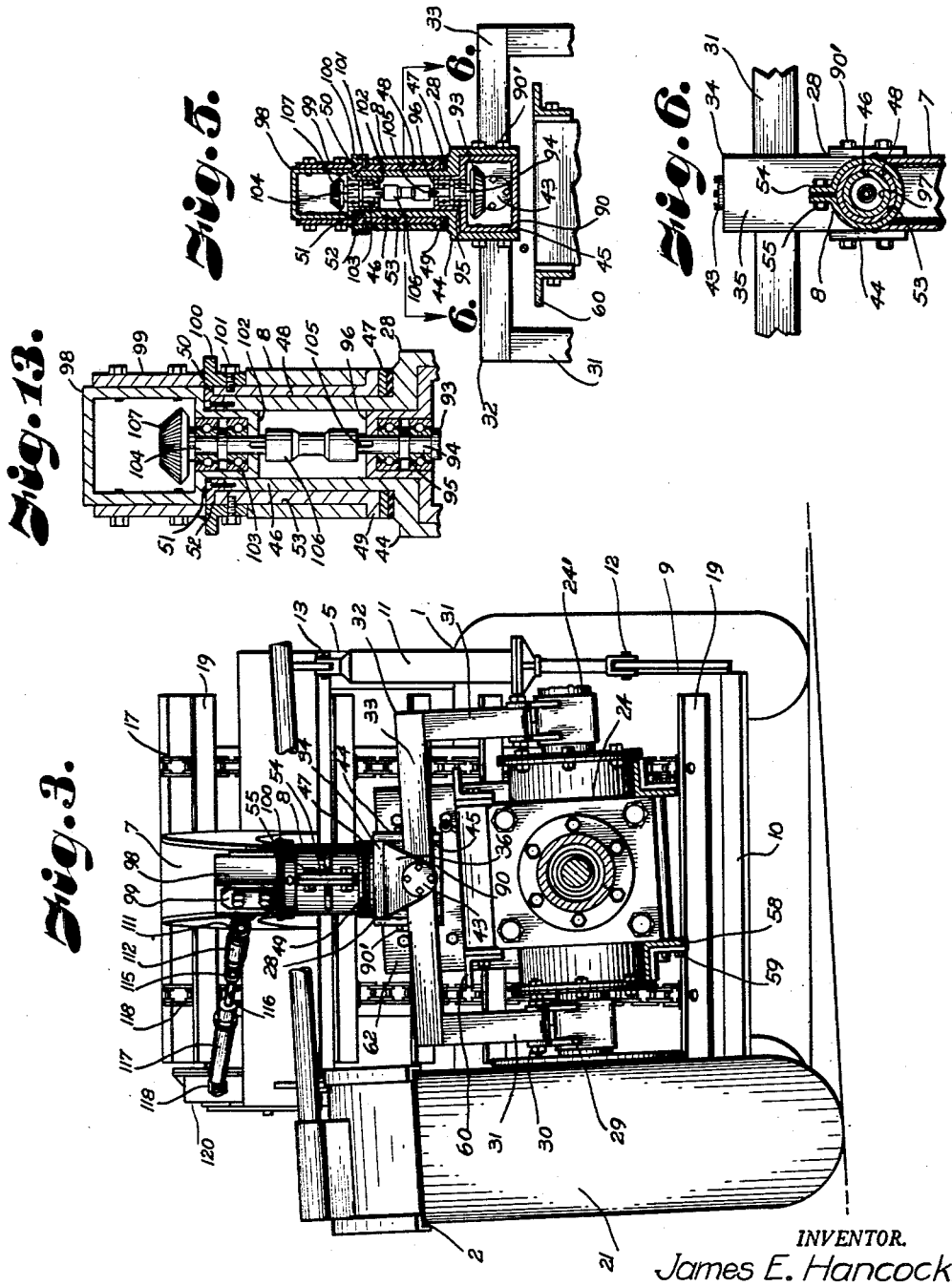
INVENTOR.
James E. Hancock.
BY
Fishburn and Gold
ATTORNEYS.

April 5, 1960 J. E. HANCOCK 2,931,451
TRACTOR TRAILER COUPLING AND POWER TRANSMISSION THERETHROUGH
Filed Feb. 17, 1958 6 Sheets-Sheet 4
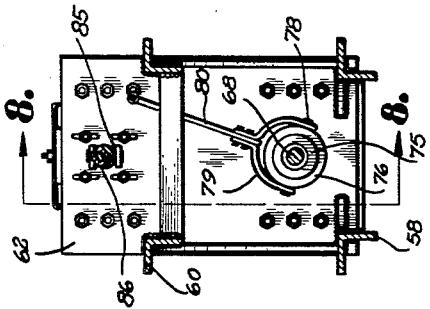
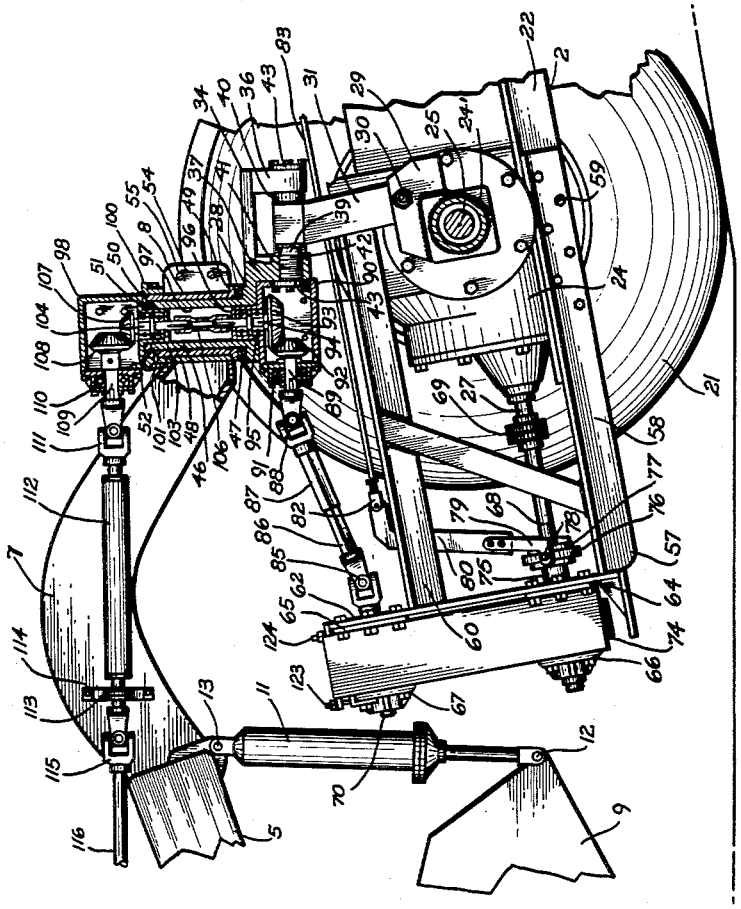
INVENTOR.
James E. Hancock.
BY
Fishburn and Gold
ATTORNEYS.

April 5, 1960 J. E. HANCOCK 2,931,451
TRACTOR TRAILER COUPLING AND POWER TRANSMISSION THERETHROUGH
Filed Feb. 17, 1958 6 Sheets-Sheet 5
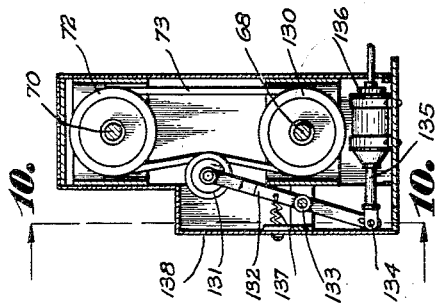
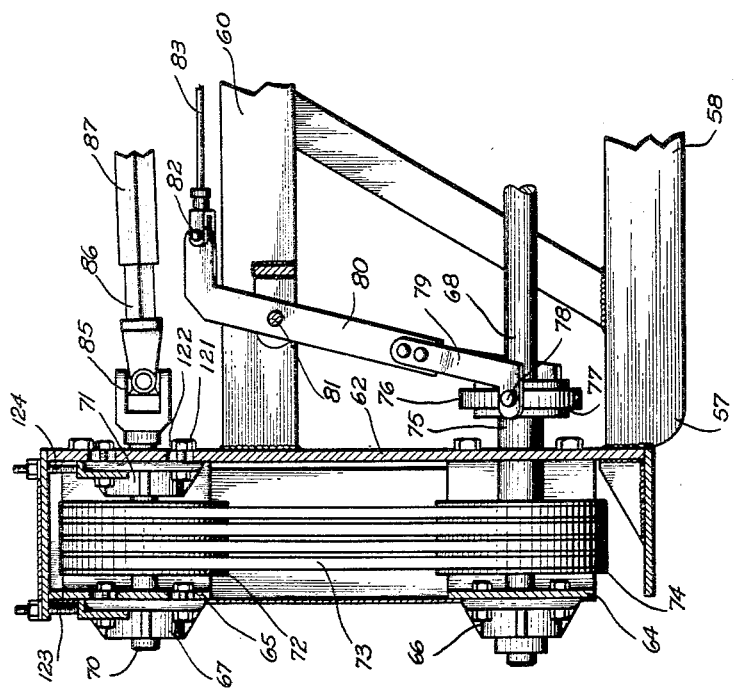
INVENTOR.
James E. Hancock.
BY
Fishburn and Gold
ATTORNEYS.

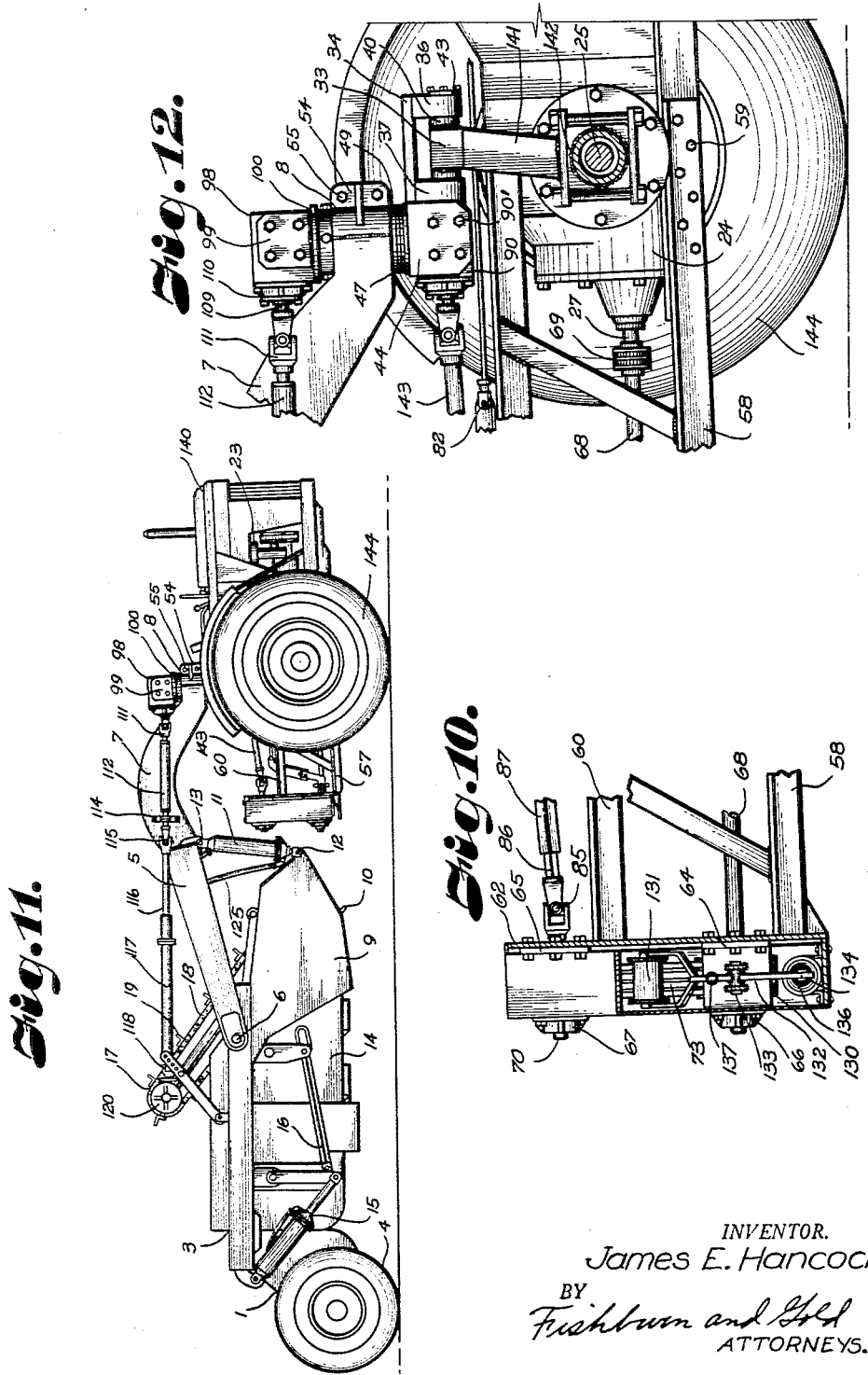
April 5, 1960 — J. E. HANCOCK — 2,931,451
TRACTOR TRAILER COUPLING AND POWER TRANSMISSION THERETHROUGH
Filed Feb. 17, 1958 — 6 Sheets-Sheet 6
INVENTOR.
James E. Hancock.
BY
Fishburn and Gold
ATTORNEYS.

United States Patent Office 2,931,451
Patented Apr. 5, 1960

2,931,451

TRACTOR TRAILER COUPLING AND POWER TRANSMISSION THERETHROUGH

James E. Hancock, Lubbock, Tex.

Application February 17, 1958, Serial No. 715,713

7 Claims. (Cl. 180—14)

This invention relates to a tractor propelled earth moving apparatus such as scrapers, and more particularly to a direct mounting or connection of the scraper and tractor and an arrangement for a drive or power connection from the tractor to operating parts on the earth moving apparatus.

Tractor propelled earth moving apparatus is commonly arranged whereby the earth moving apparatus is connected to the tractor in trailing relationship with the tractor and trailer structure or scraper connected by a coupling device called a "fifth" wheel. With tractor propelled scrapers, the fifth wheel usually includes a ball and socket unit and stabilizing members, and when there are operating parts on the trailer or scraper, they are driven from a power take-off of the tractor through a telescoping drive shaft having universal joints at the power take-off shaft and adjacent a support on the scraper. The drive through the telescoping drive shaft and universal joint is such that the tractor and trailer may have tilted relation, one traveling over uneven or hilly ground, and the longitudinal axes of the tractor and trailer can assume some angular relation as when turning. However, the angular relationship of the longitudinal axes of the tractor and trailer are limited to less than a right angle, thereby limiting the turning radius and maneuverability of the equipment due to the limits of the angle the telescoping drive shaft can assume with the power take-off shaft which is spaced from the fifth wheel in conventional structures.

The principal objects of the present invention are to provide a tractor propelled trailer, such as earth moving apparatus, with a power connection from the tractor to the operating parts on the trailer that eliminates the above disadvantages and permits increased maneuverability; to provide a tractor propelled earth moving apparatus with a coupling structure and mounting therefor which stabilizes the forward end of the trailing apparatus while moving over uneven or hilly ground; to provide such a structure with a power transmission apparatus from the tractor power take-off through the coupling device to operating parts on the earth moving apparatus that permits the longitudinal axes of the tractor and trailing apparatus to assume a right angle for a short turning radius and maneuverability; to provide such a structure wherein the angular relationship of the tractor and trailing apparatus, as when turning, imparts no additional stress on the drive connecting apparatus between the tractor and trailer; to provide such an apparatus in which all universal joints in driving members move through a substantially minimum angle; to provide a clutch controlled friction drive unit in the power transmission apparatus whereby the friction drive will slip if movement of the driven member is obstructed, thereby preventing damage to the driving apparatus; to provide such a structure wherein the coupling device includes sections rotatably mounted on a substantially vertical axis with one of the sections non-rotatably connected to the trailing apparatus and the other section non-rotatably connected to the tractor; to provide such an apparatus wherein the coupling, as a whole, is pivotally mounted about a horizontal transverse axis and a substantially horizontal longitudinal axis with the coupling joint above said horizontal axes; and to provide a unique structure that combines the draft connection and the power transmission from a tractor to a trailing apparatus that is relatively compact, sturdy, and efficient in operation regardless of the angle of draft between the tractor and trailing implement.

Other objects and advantages of this invention will become apparent from the following description taken in connection with the accompanying drawings, wherein are set forth by way of illustration and examples, certain embodiments of this invention.

Fig. 1 is a side elevation of a four wheel tractor and trailer implement connected with a draft coupling and power transmission structure embodying the features of the present invention.

Fig. 2 is an enlarged side elevation of the forward portion of the trailing implement and rearward portion of the tractor, with portions broken away to illustrate the draft coupling and drive mechanism.

Fig. 3 is a transverse sectional view through the tractor on the line 3—3, Fig. 2, looking rearwardly toward the trailing implement.

Fig. 4 is a partial side elevation of a tractor and trailing apparatus, with portions broken away to illustrate the structure thereof.

Fig. 5 is a vertical sectional view through the coupling and drive mechanism on the line 5—5, Fig. 2.

Fig. 6 is a horizontal sectional view through the coupling and drive mechanism on the line 6—6, Fig. 5.

Fig. 7 is a vertical sectional view through the tractor extension frame and drive mechanism on the line 7—7, Fig. 2.

Fig. 8 is a vertical sectional view through the drive mechanism on the line 8—8, Fig. 7.

Fig. 9 is a vertical sectional view through a modified form of drive mechanism and control therefor.

Fig. 10 is a vertical sectional view through the modified form of drive mechanism on the line 10—10, Fig. 9.

Fig. 11 is a side elevational view of a tractor propelled earth moving apparatus wherein the tractor is of two wheeled type.

Fig. 12 is a vertical sectional view through the rear portion of the tractor illustrating the mounting of the A-frame on the two wheeled tractor.

Fig. 13 is an enlarged partial vertical sectional view through the draft coupling of the tractor and trailer apparatus illustrating the ring for retaining the sleeve on the hollow post.

Referring more in detail to the drawings:

1 designates a trailer type implement propelled by a tractor 2 with a power or drive connection from the tractor to operating parts on the trailer type implement for driving same. In the illustrated structure, the trailer type implement is earth moving apparatus such as a scraper having a frame 3, the rear end of which is supported by ground-engaging wheels 4 and the forward end of said frame having a pair of arms 5 pivotally connected thereto as at 6 with said arms extending forwardly and terminating in a gooseneck 7 having a fifth wheel connection or draft coupling member 8 at its forward end. Side members 9 depend from the forward portion of the frame 3 with a scraper blade 10 disposed therebetween and extending transversely of the trailer unit. An hydraulic extensible member 11 has its ends 12 and 13 connected to the side members 9 and arms 5 respectively in spaced relation to the pivot 6 whereby extension of the extensible member 11 moves the side members 9 and blade 10 downwardly relative to the arms 5 to engage the scraper blade 10 with the ground. Rearwardly of the scraper blade 10 is one or more boxes 14 for receiving earth scraped up by the blade, the one or more boxes 14 being swingably carried relative to the frame with the swinging movement under control of an extensible hydraulic member 15 and linkage 16 whereby the boxes are positioned to collect earth or swung to dumping position to spread the earth under the structure. The earth receiving boxes and the dumping and spreading structure and operating members therefor are exemplary only as any suitable structure may be used.

A conveyor 17 is supported on the scraper structure whereby operation of said conveyor moves the chains 18 thereof and the flights 19 thereon rearwardly and upwardly on the lower run of said conveyor whereby it rakes dirt from the scraper blade 10 rearwardly into the boxes 14, the forward lower end of the conveyor being suitably supported whereby it will float upwardly on earth being moved over the scraper blade but its downward movement is limited so the flights will pass over the scraper blade in closely spaced relation thereto.

The trailer type scraper apparatus illustrated and described, with the exception of the support for the gooseneck 7 and the drive for the conveyor 17, is preferably of the structure disclosed and described in the Hancock Patent No. 2,791,041, issued May 7, 1957, on "Earth Handling Apparatus."

The tractor 2 may be either wheel or track type suitable for propelling the scraper and having a power take-off; however, it is preferred to employ a wheel type tractor having inflated rubber tired steering wheels 20 and inflated rubber tired driving wheels 21. The tractor may be of either the two-wheel drive or four-wheel drive type as desired. The tractor has a frame 22 with an engine 23 thereon connected through the usual transmission case to a differential in a differential housing 24 having oppositely extending axle housings 24' enclosing wheel driving axles 25 for driving the wheels 21. The tractor has an operator's station 26 above and spaced forwardly of the differential housing 24 in a position to facilitate driving of the tractor and operating the various controls therefor. The tractor has an auxiliary power shaft or power take-off shaft 27 which may be in any suitable position and connection to the the tractor power. In the illustrated structure the shaft 27 is extending rearwardly from the differential housing 24 operable independently of the axles 25 for providing driving power to the conveyor 17 as later described.

The forward end of the gooseneck 7 is supported on the tractor 2 substantially over the differential housing 24 for pivotal movement in turning of the apparatus and traversing hilly and uneven ground by a fifth wheel apparatus 28 carried by the tractor. Spaced brackets 29 are fixed at opposite sides of the differential housing 24 to the axle housings 24' as by welding and carry pivot pins 30 to mount the lower ends of legs 31 of an inverted U-frame or coupling support 32. The inverted U-frame is arranged whereby the legs 31 are on opposite sides of the differential housing 24 with their upper ends connected by a bar 33 extending transversely of the tractor above the differential housing 24, the pivot pins 30 being arranged whereby the inverted U-frame is swingable about an axis extending transversely of the tractor substantially parallel with the axis of the axles 25. A rocker or intermediate frame 34 is rotatably mounted on the inverted U-frame for rotation about an axis extending longitudinally of the tractor. The rocker frame 34 is preferably arranged to pivot about an axis substantially centrally of the width of the tractor and midway the width of the inverted U-frame 32. The rocker frame includes a plate member 35 having spaced depending ears 36 and 37 substantially straddling the inverted U-frame top bar 33 with inwardly extending trunnions 39 on said ears rotatably mounted in oppositely opening sockets 40 in said top bar 33 of the inverted U-frame. The sockets 40 are preferably tapered outwardly and the trunnions correspondingly tapered, the tapered portion of the trunnions terminating in threaded portions 41 screwed in threaded bores 42 in the ears 36 and 37 whereby screwing the trunnions in and out relative to the sockets will provide an adjustment for the bearings formed by the trunnions and sockets to substantially eliminate play in the rotatable mounting of the rocker frame on the inverted U-frame. Retainer caps 43 are secured on the ears 36 and 37 by suitable fastening devices to hold the trunnions in adjusted position. The rocker frame extends rearwardly from the inverted U-frame and has depending side plates 44 on the top plate 35 which cooperate with the top plate and rearwardly disposed ear 37 to form a gear box receiving recess 45 as later described.

A hollow fifth wheel post 46 extends upwardly from the rearward portion of the top plate 35 above the recess 45 at right angles to the axis of the trunnions 40. A pair of thrust washers or bearing plates 47 are sleeved on the post 46 and engage the top plate 35 and a bushing or sleeve 48 is rotatably mounted on said post, said sleeve having an annular flange portion 49 at the lower end thereof resting on the upper washer 47. A ring member 50 is secured to the upper end of the hollow post 46 by suitable fastening devices such as screws 51, said ring member having an annular flange portion 52 extending outwardly and engaging the upper end of the sleeve 48 to retain same against upward movement on the post. The forward end of the gooseneck 7 has a bore 53 for receiving the sleeve 48 with forwardly extending flanges 54 on opposite sides of a radial slot in said forward end of the gooseneck with fastening devices 55 engaging said flanges 54 to draw same together to tighten the bore 53 on to the sleeve 48 to secure said sleeve or bushing 48 to the forward end of the gooseneck and form a bearing therefor. The sleeve 48 may be secured to the gooseneck by any suitable manner as for example by welding. The clamp fastener is preferred only for ease of replacement of the sleeve. The sleeve 48 is of greater heighth than the forward end of the gooseneck, as illustrated in Fig. 4. With this arrangement, the sleeve or bushing 48 serves as a bearing for the forward end of the gooseneck 7 of the scraper and forms a rotatable connection with the hollow fifth wheel post 46 whereby the longitudinal axes of the scraper and tractor may assume angular relationship as when turning and the lateral rocking of the rocker frame provides for lateral inclined relationship of the tractor and scraper as when moving over uneven ground, and the swinging of the inverted U-frame about the transverse axis defined by the pins 30 permits movement of the tractor and scraper over hilly ground without undue stress on the draft connection between the tractor and trailer or scraper. The support for the gooseneck of the scraper, which in turn supports the forward end of the scraper, applies the weight thereof to the drive wheels of the tractor to increase the traction thereon. Also, the positioning of the fifth wheel or draft connection is such that there is no interference in turning of the tractor relative to the scraper to a position whereby the longitudinal axis of the tractor is at right angles to the longitudinal axis of the scraper.

The drive from the power take-off shaft 27 to the conveyor 17 is such that there is no interference therewith at the various angular positions between the axes of the tractor and scraper. The drive and support therefor includes a tractor frame extension 57 having laterally spaced lower members 58 suitably secured as by fastening devices 59 with the tractor frame 22 and extending rearwardly therefrom. Laterally spaced upper frame members 60 are secured on opposite sides of the differential housing 24 above the axle housings 24' and extend rearwardly therefrom with the rear ends of the frame members 58 and 60 suitably secured as by welding to an upright rear plate 62, suitable bracing bars 63 extending between and suitably secured to the frame members 58 and 60 cooperating with the mountings of said frame members and the rear plate 62 to make a substantially rigid structure for supporting drive members as later described. Vertically spaced bearing brackets 64 and 65 are secured to the rear plate 62 to suitably support bearings 66 and 67 respectively in rearwardly spaced relation to said rear plate 62. The bearing 66 is substantially in axial alignment with the power take-off shaft 27 and rotatably mounts the rear end portion of a drive shaft extension 68, the forward end portion of said drive shaft extension being suitably connected by a flexible coupling 69 with the power take-off shaft 27. The rear end of a shaft 70 is rotatably mounted in the bearing 67 the forward end of said shaft being supported by a bearing member 71 suitably secured to the rear plate 62 whereby said bearings 67 and 71 support the shaft 70 in substantially parallel relation to the shaft extension 68. A sheave pulley 72 is fixed on the shaft 70 and is operatively connected by flexible driving members such as belts 73 with a sheave pulley 74 rotatably mounted on the shaft extension 68, said sheave pulleys 72 and 74 being between the bearings 66 and 67 and the rear plate 62.

A conventional clutch operatively connects the sheave pulley 74 with the drive shaft extension 68, said clutch including a shiftable member 75 suitably keyed to the shaft 68 and movable by a ring 76 engaged in a groove 77 in said clutch shift member, said disc having ears 78 engaged by a yoke 79 of a lever 80 pivotally mounted on a pin 81 with the other end of said lever connected as at 82 to a control rod 83 extending forwardly of the tractor to a control lever 84. The forward end of the shaft 70 is connected by a universal joint 85 to one member 86 of a telescoping drive shaft, the other member 87 of which is connected by a universal joint 88 with a shaft 89 in a gear box 90 mounted in the recess 45 of the rocker frame whereby the shaft 89 is coaxial with the trunnions 40 which rotatably mount the rocker frame on the inverted U-frame. The shaft 89 is rotatably mounted in bearings 91 carried by the housing 90 with the inner end of said shaft having a bevel gear 92 fixed thereon and meshing with a bevel gear 93 fixed on a shaft 94 rotatably mounted in bearings 95 supported in a gear box extension 96 extending upwardly from said gear box and having a peripheral shape substantially corresponding to the bore 97 in the fifth wheel post 46 to align the shaft 94 with the axis of said post 46. The gear box 90 is positioned between the depending side walls 44 and is secured in position by suitable fastening devices such as screws 90' to rigidly connect the gear box to said side walls 44 and thereby fix the axes of the shaft 89 and shaft 94 relative to the axes of the trunnions 40 and the post 46. While bevel gears 92 and 93 are shown in the gear box 90, it is to be understood that any suitable power transmission devices may be used which will provide the drive with the change of direction thereof from the input shaft 89 and output shaft 94.

The output shaft 94 is operatively connected through suitable gearing or other power transmission mechanism to the conveyor mechanism on the scraper. In the illustrated structure, a gear box 98 is secured to upstanding side plates 99 fixed on a cap member 100 that sleeves over the upper portion of the sleeve 48 and is fixed thereto by suitable fastening devices such as screws 101. The gear box has a downward extension 102 having bearings 103 which rotatably support a shaft 104 in coaxial alignment with the shaft 94. The adjacent ends of the shafts 94 and 104 are preferably splined as at 105 to key same to a coupling member 106 whereby the rotation of the shaft 94 will rotate the shaft 104. The upper end of the shaft 104 in the gear box 98 has a bevel gear 107 fixed thereto and meshing with a bevel gear 108 fixed on an output shaft 109 rotatably mounted in bearings 110 carried by the gear box 98. The gears 107 and 108 provide a change direction drive, however, other suitable drive mechanism may be used in the box 98 to effect rotation of the shaft 109 in response to rotation of the shaft 104.

The gear box 98 is fixed to the plates 99 which in turn are fixed to the cap member 100 secured to the sleeve 48 that is held in fixed relation to the gooseneck 7 of the scraper, the gear box being turned whereby the shaft 109 extends rearwardly therefrom to one side of the gooseneck with the rear end of the shaft 109 connected by a universal joint 111 with the forward end of a shaft 112 also extending alongside of the gooseneck 7 with the rear portion of said shaft 112 suitably supported in a bearing 113 carried by a bracket 114 on the side of the gooseneck 7. Adjacent the bearing 113 and rearwardly thereof, the shaft 112 is connected by a universal joint 115 with one end of a telescoping shaft member 116 which rotates the other member 117 of said telescoping shaft with the rear end of said telescoping shaft member 117 being connected by a flexible joint 118 with a shaft 119 that drives suitable gearing in a housing 120 on one side of the conveyor structure to drive the conveyor.

It is preferable to support the bearings 67 and 71 on the brackets 65 and plate 62 respectively by suitable fastening devices 121 which extend through slots 122 whereby the bearings may be moved to change the spacing between the shafts 68 and 70 to adjust the tension on the belt 73. Adjusting screws 123 are supported in a plate 124 secured to the brackets 65 and plate 62 to facilitate moving of the bearings 67 and 71.

In using a structure constructed and assembled as described, the engine on the tractor is started and operatively connected through the differential and axles 25 to the driving wheels, whereby the tractor will propel the scraper to a location where the scraper is to be loaded. Fluid from a source of fluid pressure and through controls on the tractor is transmitted through fluid lines 125 to the extensible member 11 whereby extending same moves the forward portion of the frame of the scraper downwardly to engage the scraper blade 10 with the earth to be moved. Then the clutch operating lever 80 is moved to effect driving engagement of the shaft 68 with the pulley 74 to rotate said pulley, and through the belt 73 drive the pulley 72 to rotate the shaft 70, telescoping shaft members 86 and 87, shaft 89, gears 92 and 93, shaft 94, coupling 106, shaft 104 and gears 107 and 108, to the shaft 109 whereby rotation of same will rotate the shafts to drive the conveyor mechanism 17. Then on movement of the tractor and scraper, the earth is moved over the scraper blade, and by the conveyor is further moved into the boxes 14 of the scraper. When a suitable amount of earth is loaded into the scraper, the hydraulic controls are operated to effect contraction of the extensible member 11 to raise the forward end of the scraper to a position as shown in Fig. 1, and the clutch lever 80 operated to disengage the drive to the conveyor 17. The tractor is then operated to propel the scraper to a point where it is to be unloaded, and the hydraulic controls operated to effect operation of the extensible member 15 to tilt the boxes 14 whereby the earth is spread under the scraper as it is further moved over the terrain on which the earth is to be deposited. If the apparatus is operated over uneven ground wherein the tractor tilts laterally relative to the scraper, the rocker frame 34 will swing laterally on the trunnions 40 to accommodate such uneven ground, but the shaft 89 being axially aligned with the trunnions such tilting will not effect the drive of the conveyor. In operating over hilly ground wherein the tractor is inclined forwardly or rearwardly relative to the scraper, the A-frame will rock about the axes of the pins 30 to accommodate the relative inclination, and the telescoping shafts 86 and 87, together with the universal joints 85 and 88, will accommodate such swinging of the A-frame without interference of the drive to the conveyor. Since the gear box 98 is fixed relative to the forward end of the gooseneck and the axes of the shafts 94 and 104 are coaxial with the axis of the fifth wheel post 46, the tractor can turn to a right angle relative to the scraper without altering the drive to the conveyor or applying any undue stress to the parts.

When it is desired to uncouple the scraper from the tractor, the hydraulic lines are disconnected, the fastening devices 101 are removed whereby the gear box and cap member 100 can be removed, the splined portion of the shaft 104 being pulled from the coupling member 106. Then the fastening devices 51 are removed and the ring member 50 separated from the post 46 whereby the sleeve 48 and forward end of the gooseneck may be lifted from the fifth wheel to complete the uncoupling of the tractor and scraper. The coupling of the scraper to the tractor is effected by reversing the operation described relative to the uncoupling.

In the form of the invention illustrated in Figs. 9 and 10, the clutch coupling the shaft 68 with the pulley 74 is omitted, and a pulley 130 is fixed to the shaft 68 and operatively connected by a belt 73 with the pulley 72 that is fixed on the shaft 70. In order to effect driving engagement of the belt 73 with the pulleys 130 and 72 a roller 131 is mounted on a lever 132 pivotally mounted as at 133 with the other end of the lever connected as at 134 with a piston rod 135 extending from a hydraulic or pneumatic cylinder 136. A spring 137 is connected to the arm 132 and to a housing 138 to urge the roller 131 away from the belt 73 whereby the belt 73 will be loosely trained over the pulleys to effect disengagement of the driving connection. Extending of the rod 135 from the cylinder 136 swings the roller 131 into engagement with the belts 73 to tighten same on the pulleys and effect driving engagement therebetween. Mechanical means for moving the lever 132 and roller 131 thereon to tighten or loosen the belt may be used if desired.

In the form of the invention illustrated in Figs. 11 and 12, the tractor 140 is of a two-wheel type. The inverted U-frame 141 has the lower ends of the legs fixed as by welding to the axle housings 142. A straight shaft 143 is substituted for the telescoping shafts 86 and 87. The remaining structure of the drives, gear boxes, and fifth wheel are the same as illustrated and described relative to the structures shown in Figs. 1 to 8 inclusive for the four-wheel type tractor. The inverted U-frame 141 being rigid with the tractor axle supports the rocker frame 34 and fifth wheel thereon in such a manner that the driving wheels 144 of the tractor support the tractor and the forward end of the gooseneck 7 and hold the tractor relative thereto whereby the tractor and scraper operate as a four-wheeled device wherein the forward axle is swingable for turning, the rocker frame and fifth wheel permitting the structure to move over uneven ground for relative lateral tilt and for relative turning movement. Otherwise, the operation of the structure shown in Figs. 11 and 12 is the same as shown and illustrated in Figs. 1 to 8 inclusive.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A coupling device for coupling a trailer to a tractor wherein the trailer has a driven member thereon and the tractor has an auxiliary power drive shaft comprising, a supporting member pivotally mounted on the tractor for swinging movement fore and aft about an axis extending transversely of the tractor, an intermediate member, means swingably supporting said intermediate member on the supporting member for lateral swinging movement about an axis extending longitudinally of the tractor, a hollow post extending upwardly from said intermediate member, an extension on the trailer projecting forwardly over said intermediate member, said extension having a bearing member thereon removably and rotatably sleeved on the post, a ring member fixed on the upper end of said hollow post and engaging said bearing member to retain same and limit longitudinal sliding movement thereof on said post, power transmission means fixed relative the trailer extension above the hollow post and having a driven shaft operatively connected with the driven member on the trailer, said power transmission having a driving shaft extending downwardly and axially into the hollow post having operative connection with said power transmission means for driving same, a second power transmission means fixed relative to the intermediate member and having an input shaft coaxial with the axis of lateral swinging movement of said intermediate member and an output shaft extending upwardly and axially into said hollow post, means operatively and separately connecting said output shaft of said second power transmission with the driving shaft of said first power transmission, and means operatively connecting the auxiliary power drive shaft with the input shaft of said second power transmission means.

2. Earth moving apparatus comprising, a tractor having a frame and a differential housing with a rearwardly extending auxiliary power drive shaft, an earth moving vehicle having an extension projecting forwardly over the top of the differential housing, means pivotally mounting the rocker member on the tractor for fore and aft and for lateral swinging movement relative the tractor, a hollow spindle fixed on the rocker member and extending upwardly therefrom rearwardly of said pivotal mounting means and at a substantially right angle to the axis of the lateral swinging movement of the rocker member, a sleeve secured to the extension of the earth moving vehicle and removably and rotatably mounted on the hollow spindle, means removably mounted on said spindle and engaging the sleeve to retain said sleeve and vehicle extension and limit longitudinal movement thereof on said spindle for rotatably coupling the tractor and vehicle, a driven member on the earth moving vehicle, a power transmission mechanism supported on the rocker member and having an input shaft extending rearwardly therefrom and coaxial with a pivotal mounting of the rocker member and an output shaft extending into the hollow spindle in coaxial relation thereto, a second power transmission fixed relative to the vehicle extension above the hollow spindle and having an input shaft extending downwardly into said hollow spindle in coaxial relation therewith and an output shaft extending toward the vehicle, means separably and operatively connecting said output shaft of the first power transmission mechanism with the input shaft of the second power transmission mechanism whereby said shafts in said hollow spindle separate when the sleeve is removed from said hollow spindle, means operatively connecting the output shaft of the second power transmission mechanism with the driven member on said vehicle, and means operatively connecting the auxiliary power drive shaft with the input shaft of the first transmission mechanism whereby the driven member on the earth moving vehicle is operated from the auxiliary power shaft of the tractor.

3. Earth moving apparatus comprising, a tractor having a frame and a differential housing with a rearwardly extending auxiliary power drive shaft, an earth moving vehicle having an extension projecting forwardly over the top of the differential housing of the tractor, a support extending transversely over the differential housing, means on opposed sides of the differential housing pivotally mounting the support for fore and aft swinging movement on an axis extending transversely of the tractor, a rocker member, bearing means pivotally mounting the rocker member on the support substantially above the differential housing for lateral swinging movement relative the tractor on an axis extending longitudinally of the tractor, a hollow spindle fixed on the rocker member and extending upwardly therefrom rearwardly of said bearing means and at a substantially right angle to the axis of the swinging movement of the rocker member, a sleeve secured to the extension of the earth moving vehicle and removably and rotatably mounted on the hollow spindle, means removably mounted on said spindle and engaging the sleeve to retain said sleeve and vehicle extension and limit longitudinal movement thereof on said spindle for rotatably coupling the tractor and vehicle, a driven member on the earth moving vehicle, a power transmission mechanism supported on the rocker member rearwardly of said bearing means pivotally mounting the rocker member and having an input shaft coaxial therewith and an output shaft extending into the hollow spindle in coaxial relation thereto, a second power transmission fixed relative to the vehicle extension above the hollow spindle and having an input shaft extending downwardly into said hollow spindle in coaxial relation therewith and an output shaft extending toward the vehicle, means separably and operably connecting said output shaft of the first power transmission mechanism with the input shaft of the second power transmission mechanism whereby said shafts in said hollow spindle separate when said sleeve is removed from said hollow spindle, means operatively connecting the output shaft of the second power transmission mechanism with the driven member on said vehicle, and means operatively connecting the auxiliary power drive shaft with the input shaft of the first transmission mechanism whereby the driven member on the earth moving vehicle is operated from the auxiliary power shaft of the tractor.

4. Earth moving apparatus comprising, a tractor having a frame and a differential housing with a rearwardly extending auxiliary power drive shaft, an earth moving vehicle having an extension projecting forwardly over the top of the differential housing of the tractor, a support extending transversely over the differential housing, means on opposed sides of the differential housing pivotally mounting the support for fore and aft swinging movement on an axis extending transversely of the tractor, a rocker member, adjustable bearing means pivotally mounting the rocker member on the support substantially above the differential housing for lateral swinging movement relative the tractor on an axis extending longitudinally of the tractor, said adjustable bearing means limiting relative axial movement of the rocker member and support, a hollow spindle fixed on the rocker member and extending upwardly therefrom rearwardly of said adjustable bearing means and at a substantially right angle to the axis of the swinging movement of the rocker member, a sleeve secured to the extension of the earth moving vehicle and removably and rotatably mounted on the hollow spindle, means removably mounted on said spindle and engaging the sleeve to retain said sleeve and vehicle extension and limit longitudinal movement thereof on said spindle for rotatably coupling the tractor and vehicle, a driven member on the earth moving vehicle, a telescoping shaft having one end operatively connected with said driven member and the other end extending toward the sleeve on the vehicle extension, a power transmission mechanism supported on the rocker member rearwardly of said adjustable bearing means pivotally mounting the rocker member and having an input shaft coaxial therewith and an output shaft extending into the hollow spindle in coaxial relation thereto, a second power transmission fixed relative to the vehicle extension above the hollow spindle and having an input shaft extending downwardly into said hollow spindle in coaxial relation therewith and an output shaft extending toward the vehicle, means operably and separably connecting said output shaft of the first power transmission mechanism with the input shaft of the second power transmission mechanism, whereby said shafts in the hollow spindle separate when said sleeve is removed from said hollow spindle, means operatively connecting the output shaft of the second power transmission mechanism with the adjacent end of the telescoping shaft, and means operatively connecting the auxiliary power drive shaft with the input shaft of the first transmission mechanism whereby the driven member on the earth moving vehicle is operated from the auxiliary power shaft of the tractor.

5. Earth moving apparatus comprising, a tractor having a frame and a differential housing with a rearwardly extending auxiliary power drive shaft, an earth moving vehicle having an extension projecting forwardly over the top of the differential housing of the tractor, a support extending transversely over the differential housing, means on opposed sides of the differential housing pivotally mounting the support for fore and aft swinging movement on an axis extending transversely of the tractor, a rocker member, means pivotally mounting the rocker member on the support substantially above the differential housing for lateral swinging movement relative the tractor on an axis extending longitudinally of the tractor, a hollow spindle fixed on the rocker member and extending upwardly therefrom at a substantially right angle to the axis of the swinging movement of the rocker member, a sleeve secured to the extension of the earth moving vehicle and removably and rotatably mounted on the hollow spindle, means on said spindle and engaging the sleeve to retain said sleeve and vehicle extension on said spindle for rotatably coupling the tractor and vehicle, a driven member on the earth moving vehicle, a gear box fixed on the vehicle extension above the hollow post and having input and output shafts in substantially right angle relation with the input shaft extending downwardly into the hollow post in coaxial relation therewith and the output shaft extending toward the vehicle, coupling means operatively connecting the output shaft of said gear box with the driven member, a second gear box having an input shaft and output shaft in right angle relation supported on the rocker frame with the input shaft in coaxial relation with the pivotal mounting of the rocker member and the output shaft extending upwardly in the hollow post in coaxial relation therewith, said output shaft of the second gear box being connected with the input shaft of the first gear box, a rearward frame extension fixed to the frame of the tractor, a belt drive having vertically spaced pulleys operatively connected by a belt, means supporting said belt drive on the frame extension with one pulley substantially aligned with the auxiliary power drive shaft of the tractor, a shaft extension operatively connecting the auxiliary power drive shaft and said one pulley, means operatively connecting said other pulley and the input shaft of the second gear box, and means effecting driving engagement of the belts and pulleys whereby rotation of the auxiliary power drive shaft drives the driven member on the earth moving vehicle in any relative position of the tractor and earth moving vehicle.

6. Earth moving apparatus comprising, a tractor having a frame and a differential housing with a rearwardly extending auxiliary power drive shaft, an earth moving vehicle having an extension projecting forwardly over the top of the differential housing of the tractor, a support extending transversely over the differential housing, means on opposed sides of the differential housing pivotally mounting the support for fore and aft swinging movement on an axis extending transversely of the tractor, a rocker member, means pivotally mounting the rocker member on the support substantially above the differential housing for lateral swinging movement relative the tractor on an axis extending longitudinally of the tractor, a hollow spindle fixed on the rocker member and extending upwardly therefrom at a substantially right angle to the axis of the swinging movement of the rocker member, a sleeve secured to the extension of the earth moving vehicle and removably and rotatably mounted on the hollow spindle, means on said spindle and engaging the sleeve to retain said sleeve and vehicle extension on said spindle for rotatably coupling the tractor and vehicle, a driven member on the earth moving vehicle, a telescoping shaft having one end operatively connected with said driven member and the other end extending toward the sleeve on the vehicle extension, a gear box fixed on the vehicle extension above the hollow post and having input and output shafts in substantially right angle relation with the input shaft extending downwardly into the hollow post in coaxial relation therewith and the output shaft extending toward the vehicle, coupling means operatively connecting the output shaft of said gear box with the other end of the telescoping shaft connected with the driven member, a second gear box having an input shaft and output shaft in right angle relation supported on the rocker frame with the input shaft in coaxial relation with the pivotal mounting of the rocker member and the output shaft extending upwardly in the hollow post in coaxial relation therewith, means operatively connecting the output shaft of the second gear box with the input shaft of the first gear box, a rearward frame extension fixed to the frame of the tractor, a belt drive having vertically spaced pulleys operatively connected by a belt, means supporting said belt drive on the frame extension with one pulley substantially aligned with the auxiliary power drive shaft of the tractor, a shaft extension operatively connecting the auxiliary power drive shaft and said one pulley, a telescoping shaft between the other pulley and the input shaft of the second gear box, flexible joints connecting said telescoping shaft with said other pulley and the input shaft of the second gear box, and means effecting driving engagement of the belts and pulleys whereby rotation of the auxiliary power drive shaft drives the driven member on the earth moving vehicle in any relative position of the tractor and earth moving vehicle.

7. Earth moving apparatus comprising, a two wheeled tractor having a frame and a differential housing with a rearwardly extending auxiliary power drive shaft, an earth moving vehicle having an extension projecting forwardly over the top of the differential housing of the tractor, a support extending transversely over the differential housing and fixed relative thereto, a rocker member, means pivotally mounting the rocker member on the support substantially above the differential housing for lateral swinging movement relative the tractor on an axis extending longitudinally of the tractor, a hollow spindle fixed on the rocker member and extending upwardly therefrom at a substantially right angle to the axis of the swinging movement of the rocker member, a sleeve secured to the extension of the earth moving vehicle and removably and rotatably mounted on the hollow spindle, means on said spindle and engaging the sleeve to retain said sleeve and vehicle extension on said spindle for rotatably coupling the tractor and vehicle, a driven member on the earth moving vehicle, a gear box fixed on the vehicle extension above the hollow post and having input and output shafts in substantially right angle relation and operatively connected with the input shaft extending downwardly into the hollow post in coaxial relation therewith and the output shaft extending toward the vehicle, coupling means operatively connecting the ouput shaft of said gear box with the driven member, a second gear box having an input shaft and output shaft in right angle relation supported on the rocker frame with the input shaft in coaxial relation with the pivotal mounting of the rocker member and the output shaft extending upwardly in the hollow post in coaxial relation therewith, said output shaft of the second gear box being operatively connected with the input shaft of the first gear box, a rearward frame extension fixed to the frame of the tractor, a belt drive having vertically spaced pulleys operatively connected by a belt, means supporting said belt drive on the frame extension with one pulley substantially aligned with the auxiliary power drive shaft of the tractor, a shaft extension operatively connecting the auxiliary power drive shaft and said one pulley, a shaft operatively connected with the other pulley and the input shaft of the second gear box, and means effecting driving engagement of the belts and pulleys whereby rotation of the auxiliary power drive shaft drives the driven member on the earth moving vehicle in any relative position of the tractor and earth moving vehicle.

References Cited in the file of this patent
UNITED STATES PATENTS

| | | |
|---|---|---|
| 1,445,754 | Casey | Feb. 20, 1923 |
| 1,661,737 | Raimer | Mar. 6, 1928 |
| 1,990,731 | Greer | Feb. 12, 1935 |
| 2,091,009 | Osman | Aug. 24, 1937 |
| 2,276,573 | Gustafson | Mar. 17, 1942 |
| 2,363,071 | Le Tourneau | Nov. 21, 1944 |
| 2,400,218 | Akers | May 14, 1946 |
| 2,400,239 | Le Tourneau | May 14, 1946 |
| 2,720,417 | Kling | Oct. 11, 1955 |